United States Patent
Gulati et al.

(10) Patent No.: US 9,986,485 B2
(45) Date of Patent: May 29, 2018

(54) FEEDBACK CONTROL FOR D2D COMMUNICATIONS

(71) Applicant: QUALCOMM Incorporated, San Diego, CA (US)

(72) Inventors: Kapil Gulati, Long Branch, NJ (US); Sudhir Kumar Baghel, Bridgewater, NJ (US); Saurabha Rangrao Tavildar, Jersey City, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/629,206

(22) Filed: Feb. 23, 2015

(65) Prior Publication Data
US 2015/0358888 A1 Dec. 10, 2015

Related U.S. Application Data

(60) Provisional application No. 62/010,353, filed on Jun. 10, 2014.

(51) Int. Cl.
*H04W 40/02* (2009.01)
*H04W 24/02* (2009.01)
(Continued)

(52) U.S. Cl.
CPC ........... *H04W 40/02* (2013.01); *H04W 8/005* (2013.01); *H04W 24/02* (2013.01); *H04W 40/10* (2013.01); *H04W 76/023* (2013.01); *Y02B 60/50* (2013.01)

(58) Field of Classification Search
None
See application file for complete search history.

(56) References Cited

U.S. PATENT DOCUMENTS

2007/0109989 A1* 5/2007 Nakagawa ............ H04W 84/20
370/328
2009/0290528 A1 11/2009 Kwon et al.
(Continued)

FOREIGN PATENT DOCUMENTS

EP 2728955 A1 5/2014
WO 2013095000 A1 6/2013

OTHER PUBLICATIONS

Interdigital: "D2D Communications", 3GPP Draft; R1-133178, 3rd Generation Partnershipproject (3GPP), Mobile Competence Centre, 650, Route Des Lucioles, F-06921 Sophia-Antipolis Cedex, France, vol. RAN WG1, No. Barcelona, Spain; Aug. 19, 2013-Aug. 23, 2013, Aug. 10, 2013 (Aug. 10, 2013), 7 Pages, XP050716387, Retrieved from the Internet: URL: http://www.3gpp.org/ftp/tsg_ran/WG1_RL1/TSGR1_74/Docs/ [retrieved on Aug. 10, 2013] p. 1-p. 5.
(Continued)

*Primary Examiner* — James P Duffy
(74) *Attorney, Agent, or Firm* — Clint R. Morin; Arent Fox, LLP

(57) ABSTRACT

A method, an apparatus, and a computer program product for wireless communication are provided. The apparatus may be a wireless communication user equipment (UE). The apparatus transmits information in a device-to-device (D2D) communication to a second UE, the information indicating whether the second UE should use a direct feedback path to the UE or an indirect feedback path to the UE. The apparatus receives feedback through one of the direct feedback path or the indirect feedback path based on the information indicated in the D2D communication. The apparatus receives a D2D communication from a second UE. The apparatus determines whether to transmit feedback in response to the D2D communication via a direct feedback path to the second UE or via an indirect feedback path to the second
(Continued)

UE. The apparatus transmits the feedback in response to the D2D communication in the determined feedback path.

31 Claims, 12 Drawing Sheets

(51) Int. Cl.
*H04W 76/02* (2009.01)
*H04W 8/00* (2009.01)
*H04W 40/10* (2009.01)

(56) References Cited

U.S. PATENT DOCUMENTS

| | | | | |
|---|---|---|---|---|
| 2011/0317614 | A1* | 12/2011 | Park | H04B 7/155 370/315 |
| 2012/0163252 | A1* | 6/2012 | Ahn | H04L 1/0003 370/280 |
| 2014/0235234 | A1* | 8/2014 | Jang | H04W 36/18 455/426.1 |
| 2014/0335906 | A1 | 11/2014 | Kim et al. | |

OTHER PUBLICATIONS

International Search Report and Written Opinion—PCT/US2015/030177—ISA/EPO—dated Aug. 20, 2015.

* cited by examiner

FEEDBACK CONTROL FOR D2D COMMUNICATIONS

CROSS-REFERENCE TO RELATED APPLICATION

This application claims the benefit of U.S. Provisional Application Ser. No. 62/010,353, entitled "FEEDBACK CONTROL FOR D2D COMMUNICATIONS" and filed on Jun. 10, 2014 which is expressly incorporated by reference herein in its entirety.

BACKGROUND

Field

The present disclosure relates generally to communication systems, and more particularly, to a method of feedback control for device-to-device (D2D) communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a wireless communication user equipment. The apparatus transmits information in a D2D communication to a second UE, the information indicating whether the second UE should use a direct feedback path to the UE or an indirect feedback path to the UE. The apparatus receives feedback through one of the direct feedback path or the indirect feedback path based on the information indicated in the D2D communication. The indirect feedback path may include a first path from the second UE to a first base station serving the second UE, a second path from the first base station to a second base station serving the UE, and a third path from the second base station to the UE. The feedback may include a power control command, and the apparatus may adjust a transmission power according to the feedback including the power control command. The feedback may correspond to an acknowledgment/negative-acknowledgement (ACK/NACK).

In an aspect of the disclosure, a method, a computer program product, and an apparatus are provided. The apparatus may be a wireless communication user equipment. The apparatus receives a D2D communication from a second UE. The apparatus determines whether to transmit feedback in response to the D2D communication via a direct feedback path to the second UE or via an indirect feedback path to the second UE. The apparatus transmits the feedback in response to the D2D communication in the determined feedback path. The indirect feedback path may include a first path from the UE to a first base station serving the UE, a second path from the first base station to a second base station serving the second UE, and a third path from the second base station to the second UE. The apparatus may receive a second D2D communication indicating whether to use the direct path or the indirect path. The second D2D communication may be a discovery signal or a scheduling assignment. The information indicated in the second D2D communication may indicate explicitly whether to use the direct path or the indirect path. The information indicated in the second D2D communication may indicate whether the second UE is within coverage of a base station. The information indicated in the second D2D communication may indicate a resource allocation mode of the second UE used for D2D communication. The UE may be configured to determine whether to use the direct feedback path or the indirect feedback path according to a resource corresponding to the second D2D communication.

In an aspect of the disclosure, a method, a computer program product, and an apparatus are provided. The apparatus may be a wireless communication user equipment. The apparatus may include a memory, and at least one processor coupled to the memory. The at least one processor is configured to transmit information in a D2D communication to a second UE, the information indicating whether the second UE should use a direct feedback path to the UE or an indirect feedback path to the UE. The at least one processor is configured to receive feedback through one of the direct feedback path or the indirect feedback path based on the information indicated in the D2D communication.

In an aspect of the disclosure, a method, a computer program product, and an apparatus are provided. The apparatus may be a wireless communication user equipment. The apparatus may include a memory, and at least one processor coupled to the memory. The at least one processor is configured to receive a D2D communication from a second UE. The at least one processor is configured to determine whether to transmit feedback in response to the D2D communication via a direct feedback path to the second UE or via an indirect feedback path to the second UE. The at least one processor is configured to transmit the feedback in response to the D2D communication in the determined feedback path.

In an aspect of the disclosure, a method, a computer program product, and an apparatus are provided. The computer program product may be stored on a computer-readable medium and may include code. The code, when executed on the at least one processor, causes the at least one processor to transmit information in a D2D communication to a second UE, the information indicating whether the second UE should use a direct feedback path to the UE or an indirect feedback path to the UE. The code, when executed on the at least one processor, causes the at least one processor to receive feedback through one of the direct feedback path or the indirect feedback path based on the information indicated in the D2D communication.

In an aspect of the disclosure, a method, a computer program product, and an apparatus are provided. The computer program product may be stored on a computer-readable medium and may include code. The code, when executed on the at least one processor, causes the at least one processor to receive a D2D communication from a second UE. The code, when executed on the at least one processor, causes the at least one processor to determine whether to transmit feedback in response to the D2D communication via a direct feedback path to the second UE or via an indirect feedback path to the second UE. The code, when executed on the at least one processor, causes the at least one processor to transmit the feedback in response to the D2D communication in the determined feedback path.

In an aspect of the disclosure, a method, a computer program product, and an apparatus are provided. The apparatus may be for wireless communication of a UE. The apparatus includes means for transmitting information in a device-to-device (D2D) communication to a second UE, the information indicating whether the second UE should use a direct feedback path to the UE or an indirect feedback path to the UE. The apparatus further includes means for receiving feedback through one of the direct feedback path or the indirect feedback path based on the information indicated in the D2D communication. The indirect feedback path may include a first path from the second UE to a base station, and a second path from the base station to the UE. The feedback may include a power control command. The feedback may correspond to an ACK/NACK. The information indicated in the D2D communication may indicate explicitly whether to use the direct path or the indirect path. The information indicated in the D2D communication may indicate whether the UE is within coverage of a base station. The information indicated in the D2D communication may indicate a resource allocation mode of the UE. The apparatus may further include means for transmitting the feedback to a base station, wherein the second UE is out-of-coverage of the base station, and means for receiving additional feedback from the base station in response to transmitting the feedback to the base station. The apparatus may further include means for transmitting a discovery signal, D2D data, or a scheduling assignment, wherein the feedback is a function of the discovery signal, D2D data, or the scheduling assignment.

In an aspect of the disclosure, a method, a computer program product, and an apparatus are provided. The apparatus may be a UE. The apparatus includes means for receiving a device-to-device (D2D) communication from a second UE. The apparatus further includes means for determining whether to transmit feedback in response to the D2D communication via a direct feedback path to the second UE or via an indirect feedback path to the second UE. The apparatus further includes means for transmitting the feedback in response to the D2D communication in the determined feedback path. The indirect feedback path may include a first path from the UE to a base station, and a second path from the base station to the second UE. The D2D communication may be a discovery signal or a scheduling assignment, and the feedback may include a power control command. The D2D communication may be a D2D data communication, and the feedback may correspond to an ACK/NACK. The apparatus may further include means for receiving a second D2D communication indicating whether to use the direct path or the indirect path. The apparatus may further include means for determining whether the UE is in uplink coverage of a base station, wherein the UE determines to use the direct feedback path when the UE is outside uplink coverage of the base station, and determines to use the indirect feedback path when the UE is in uplink coverage of the base station. The means for determining may be configured to determine the direct feedback path or the indirect feedback path according to information from a base station, or according to information stored in the UE.

DETAILED DESCRIPTION

Figure 1:
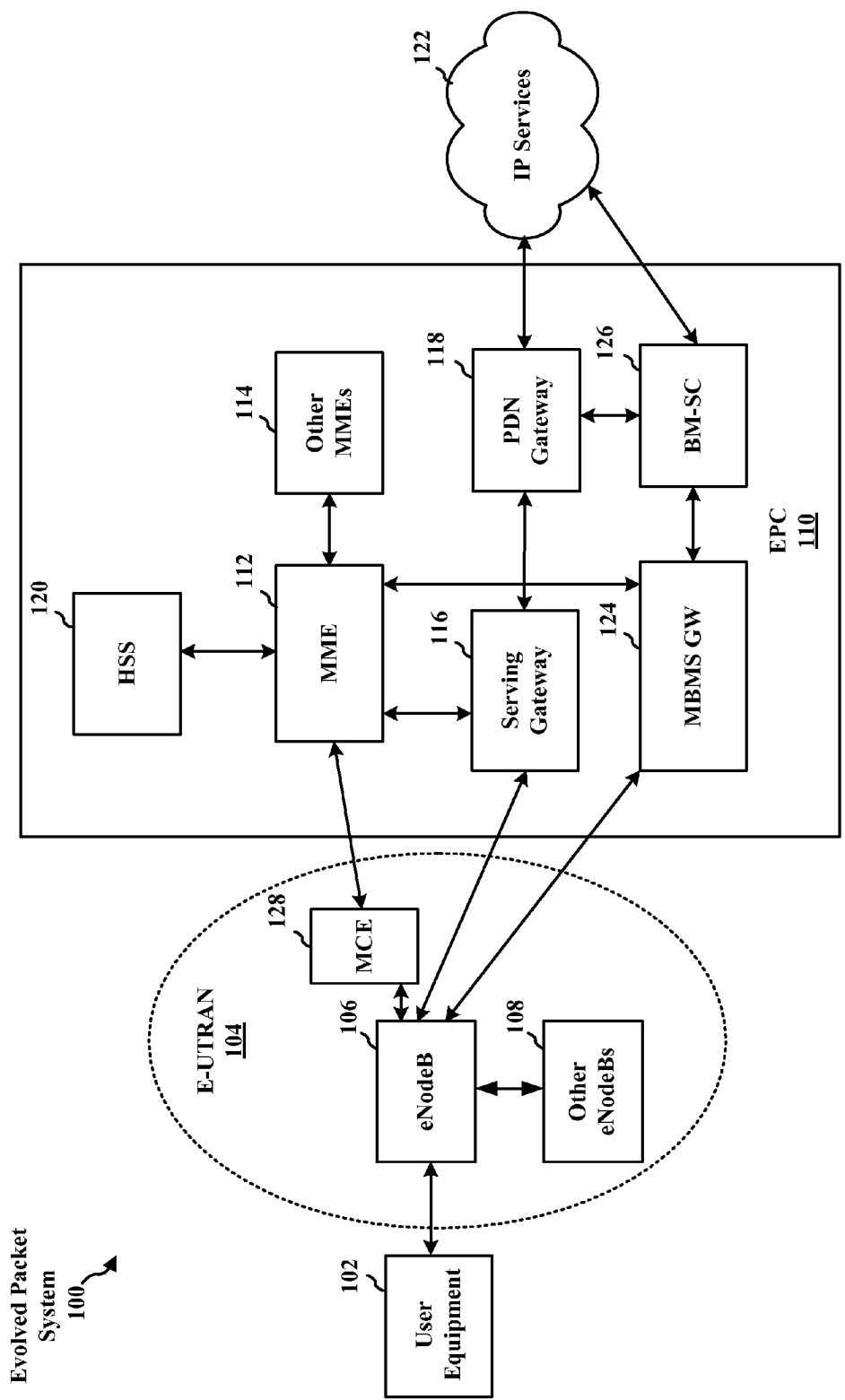
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
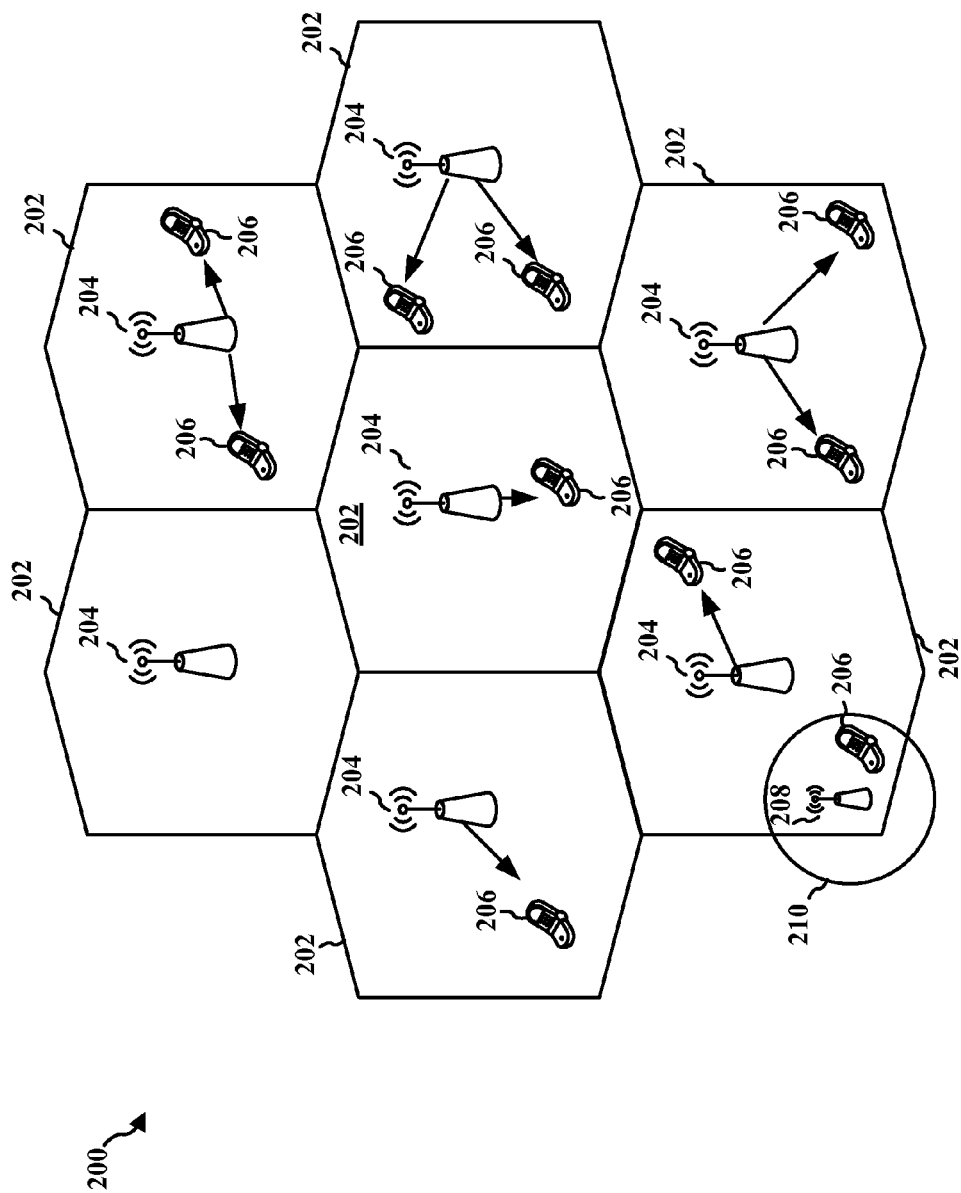
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
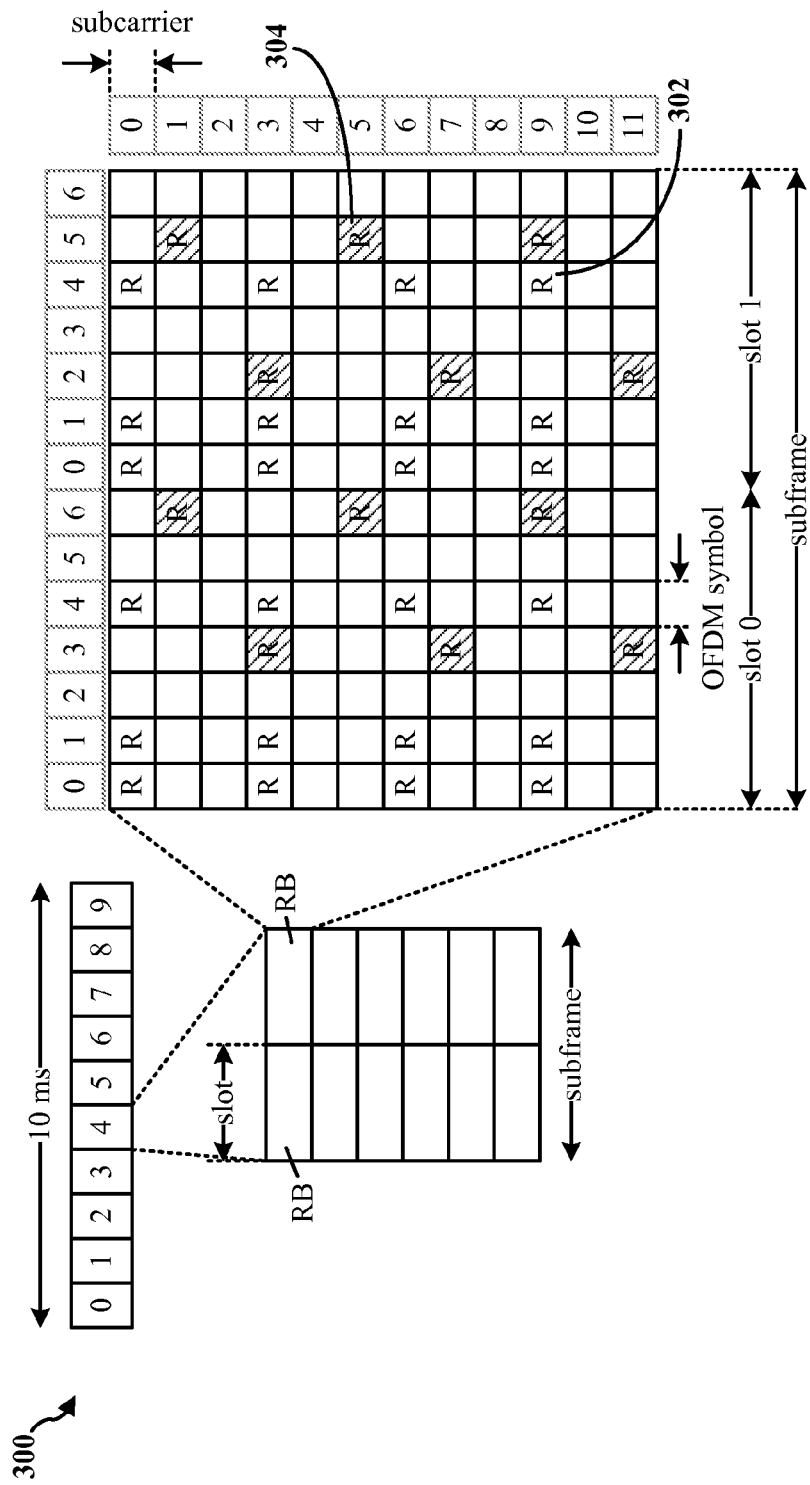
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
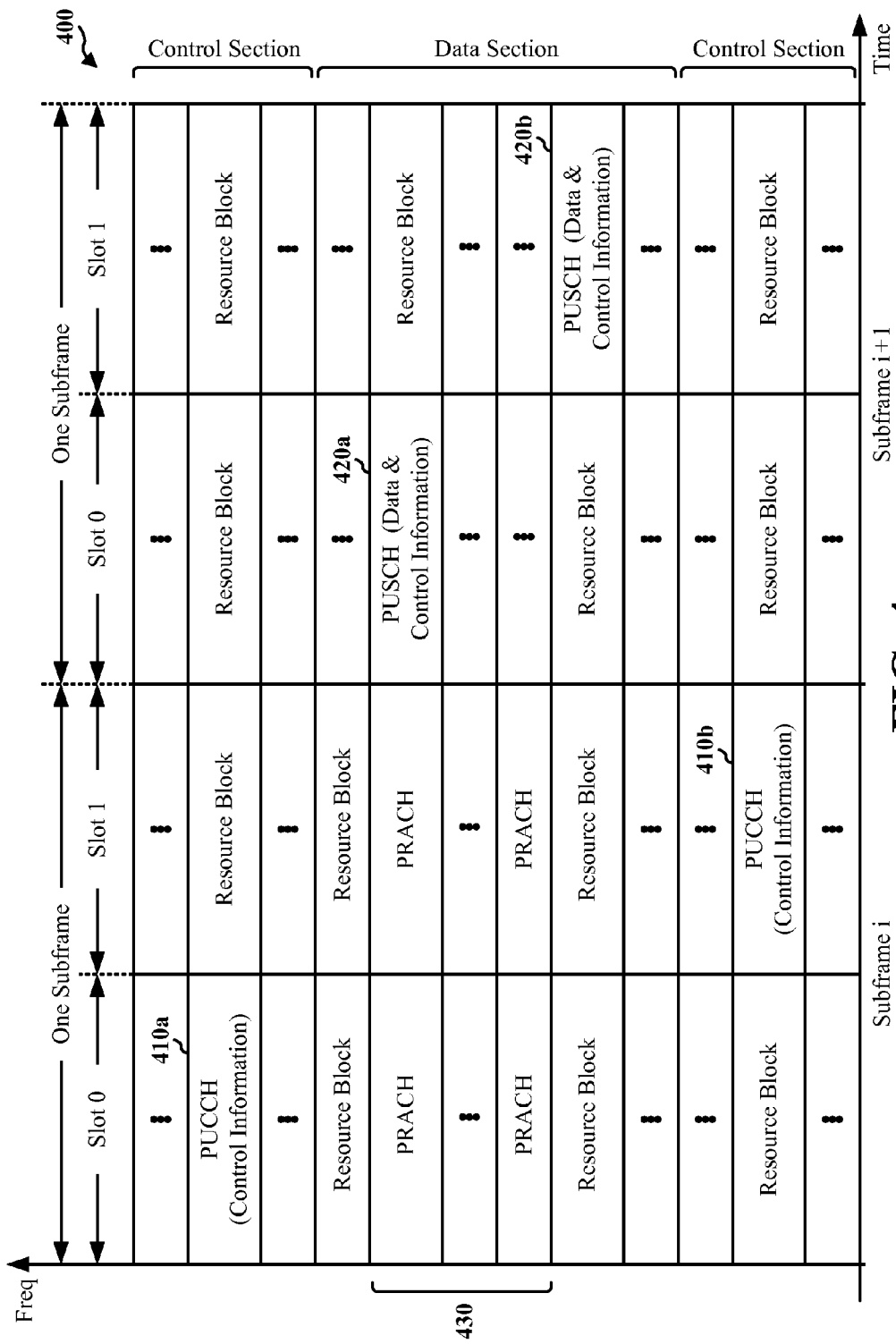
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
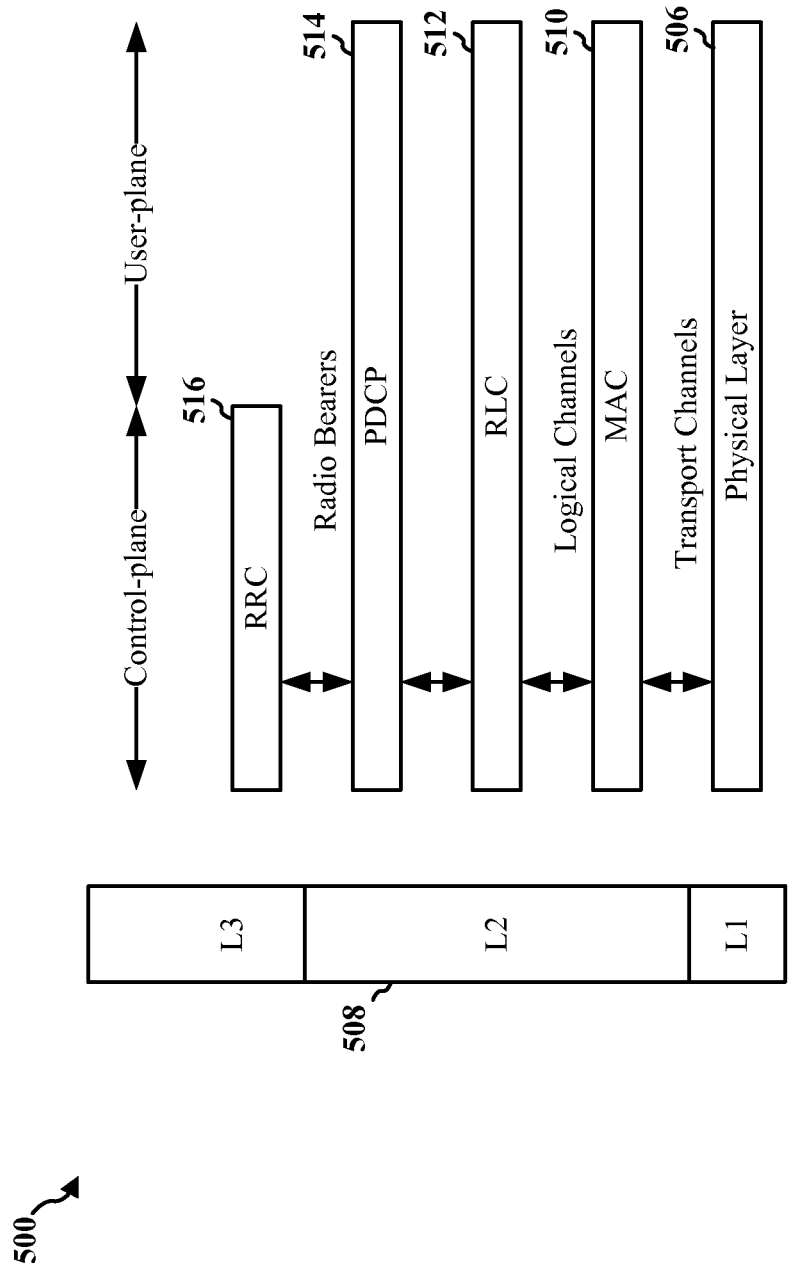
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
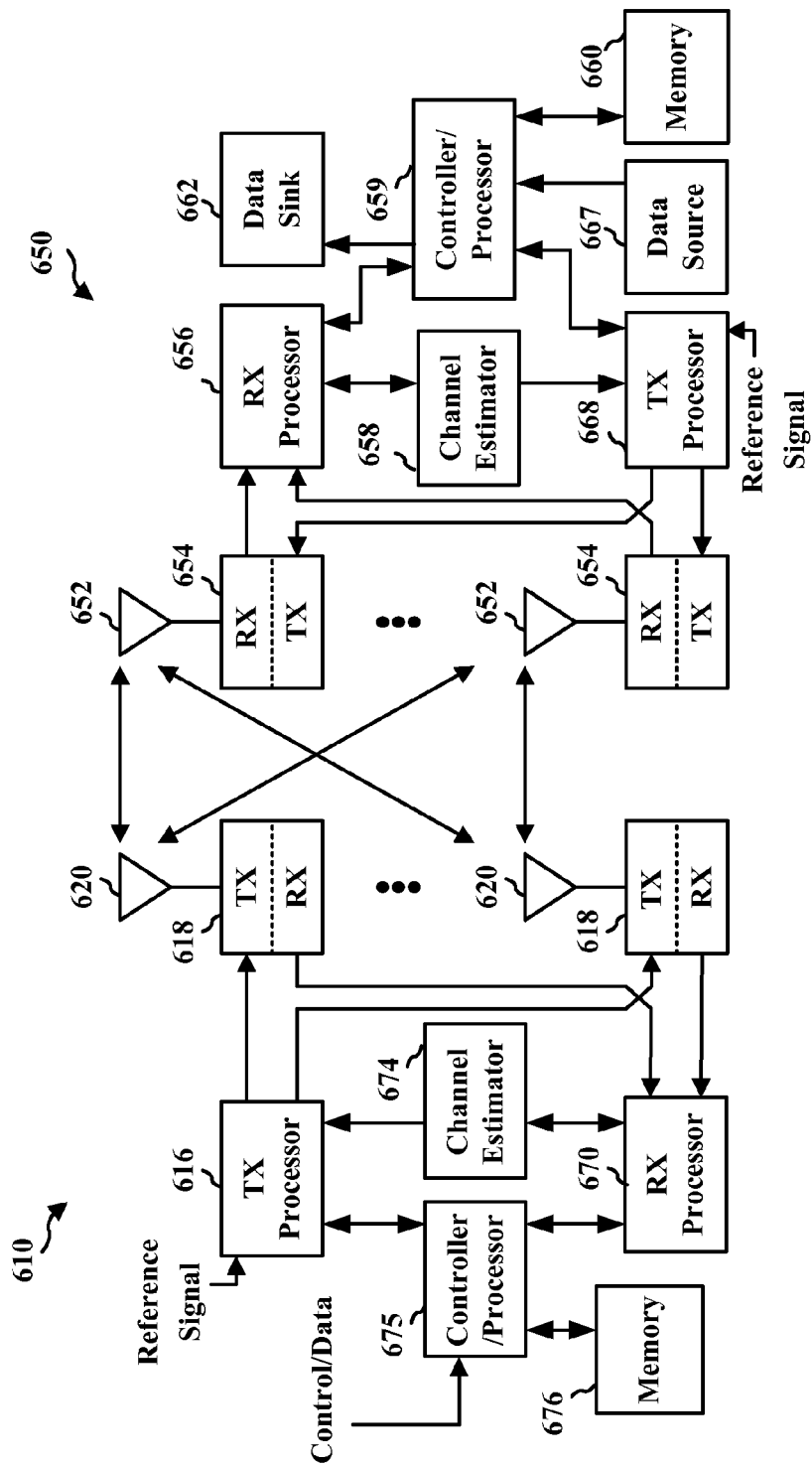
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
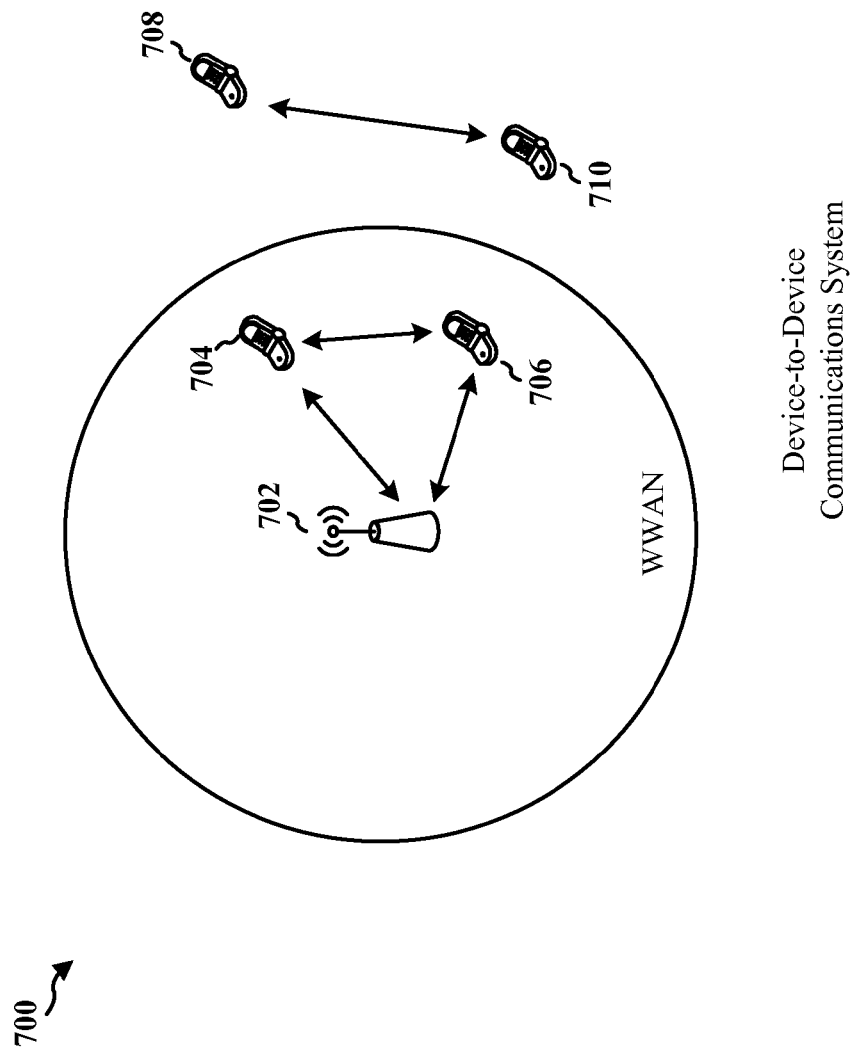
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as, for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Exemplary embodiments discussed below relate to using feedback (e.g., feedback information, or feedback control information) from one or more UEs in a network to control aspects of D2D communication amongst the UEs.

Currently, the focus of design of the layer L1, or the physical layer (PHY layer), for D2D communication has been mainly limited to broadcast communications, and the design of the physical layer has assumed that no feedback channel is present. The broadcast-L1 design currently used may also be used for groupcast and unicast D2D communications, whereby the layer L2, or the MAC layer, differentiates between unicast traffic, groupcast traffic, and broadcast traffic. However, reusing the broadcast-L1 for unicast traffic and groupcast traffic may lead to suboptimal performance. Network performance for unicast and groupcast may be improved with the introduction of feedback paths, or feedback channels, for D2D communications. Feedback control via feedback paths, or feedback control paths, may also improve D2D traffic for broadcast, in addition to unicast and groupcast.

For example, if there is a relatively small group of UEs, and the UEs of the group are going to remain relatively close, then it may be inefficient for the UEs that are transmitting to transmit signals at full power. However, the size and proximity of the group of UEs would not be immediately apparent, so a transmitter/transmitting/TX UE (e.g., D2D transmitter) may initially transmit at full power, and may thereafter receive feedback from one or more receiver/receiving/RX UEs (e.g., D2D receivers) in the group. The TX UE may then determine that it is transmitting signals at a power, or of a signal strength, that is higher than necessary, and may then accordingly reduce the power at which it transmits additional signals to the RX UE.

As another example, there may be four blind hub transmissions, meaning that every packet transmitted by a TX UE is transmitted "blindly" four times. That is, each packet is transmitted four times even for any broadcast station RX UEs on an edge of a cell of the network. However, by providing feedback via the feedback channels of the embodiments described below, the RX UEs may obtain an "ACK/NACK" message (e.g., a message corresponding to an acknowledgment-based or negative-acknowledgment-based protocol), thereby obviating the need to retransmit, and reducing the total number of transmissions within the network.

In the embodiments described below, the various UEs may be in one of two modes (e.g., Mode 1 and Mode 2), which are briefly described below for understanding of the exemplary embodiments.

In Mode 1, the eNB assigns, or allocates, resources to UEs for both the scheduling assignments (SAs) and for D2D data. In this method, a TX UE may contact the eNB to express the UE's intention to transmit D2D data (e.g., by transmitting a "D2D start indication"), and then the eNB may give the TX UE a resource for transmitting a SA, and may also give the UE resources for data. Thereafter, the UE can transmit the SA, which includes the resources for data. Accordingly, an RX UE may simply monitor the SA to determine when to expect the data. This may be accomplished by the eNB controlling the UE's transmission power of SA and data using Physical Downlink Control Channel (PDCCH) or EPDCCH.

In Mode 2, a UE can select a resource on its own. That is, the TX UE would be aware of a pool of SAs, and could choose one of the resources on which the UE intends to transmit data corresponding to the D2D communication.

Accordingly, in Mode 1, a TX UE would be in an RRC connected state, while RX UEs may be in either an RRC idle state or an RRC connected state. In Mode 2, the TX UE and the RX UEs may be in an RRC idle state or an RRC connected state.

According to the exemplary embodiments described below, there are, generally, two different feedback paths/channels. Which of the feedback paths is used to transmit feedback may be determined using a variety of factors, as will be discussed below. Furthermore, as will also be discussed further below, the feedback may generally be a function of one or more factors—a discovery signal transmitted by a TX UE, an SA transmitted by the TX UE, and/or D2D data. In particular, the feedback may be power control and/or ACK/NACK (e.g., HARQ ACK/NACK). A UE may provide power control feedback when receiving a discovery signal transmitted by a TX UE and/or an SA transmitted by the TX UE. A UE may provide ACK/NACK feedback when receiving D2D data.

Figure 8:
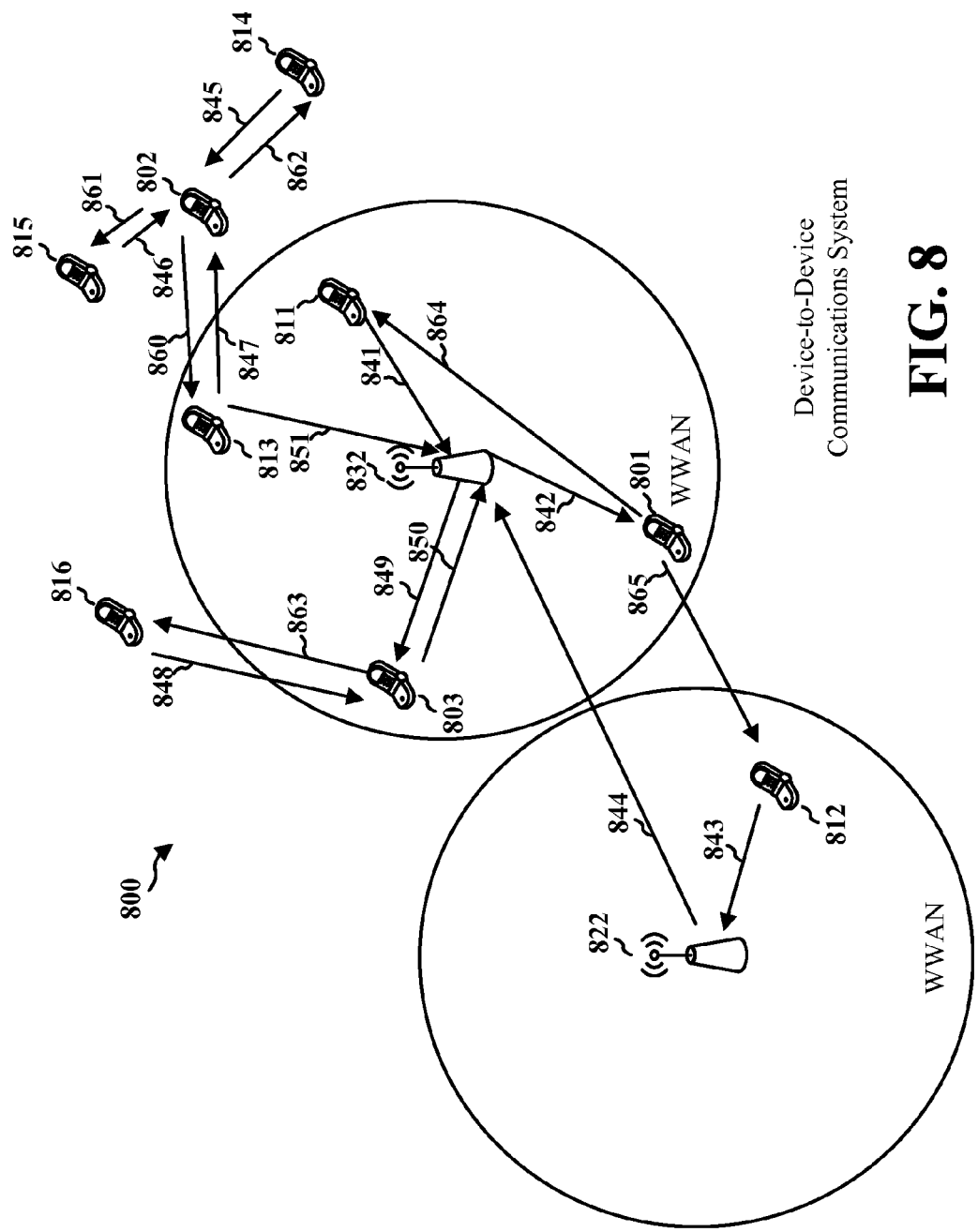
FIG. 8 is a diagram of a device-to-device communications system of an exemplary embodiment.

FIG. 8 is a diagram of a device-to-device communications system 800. In FIG. 8, four scenarios are depicted. In a first scenario a TX UE 801 and an RX UE 811 are both being serviced by a first eNB 832. In a second scenario, the TX UE 801 is being serviced by the first eNB 832, and an RX UE 812 is being serviced by a second eNB 822. In a third scenario, a TX UE 803 is in coverage (e.g., within a cell serviced by the first eNB 832), while an RX UE 816 is out of coverage. In a fourth scenario, an RX UE 813 is in coverage (e.g., within a cell serviced by the first eNB 832), while a TX UE 802 and two other RX UEs 814 and 815 are out of coverage.

As previously mentioned, there are generally two feedback paths. A first feedback path may be referred to as a direct feedback path. In a direct feedback path, RX UE transmits feedback directly to a TX UE. For example, RX UEs 813, 814, and 815 transmit feedback to TX UE 802 via feedback paths 847, 845, and 846, respectively. As another example, RX UE 816 transmits feedback to TX UE 803 via feedback path 848.

A second feedback path includes a path through one or more serving eNBs (e.g., eNBs 822 and/or 832), which may be referred to as an indirect feedback path. In an indirect feedback path, an RX UE may transmit feedback to an eNB that is serving the RX UE (e.g., see feedback path 841 from RX UE 811 to eNB 832, and feedback path 843 from RX UE 812 to eNB 822). The eNB may then transmit the feedback to another eNB or to a TX UE.

After receiving the feedback, if a corresponding TX UE and the RX UE are served by the same eNB (e.g., see TX UE 801, RX UE 811, and eNB 832), then the eNB 832 may transmit the feedback received from the RX UE 811 to the TX UE 801 via feedback path 842. If, however, the TX UE and RX UE are covered by different cells, and are therefore served by different eNBs (e.g., TX UE 801 and RX UE 812), then the eNB 822 serving the RX UE 812 may transmit the feedback to the eNB 832 serving the TX UE 801 via feedback path 844, and the neighboring eNB 832 may then transmit the feedback to the TX UE 801 via feedback path 842.

By providing the indirect feedback path in addition to the direct control path, the corresponding eNB is given some control over the D2D communications occurring in its cell. For example, if there are multiple RX UEs that are transmitting feedback, with some of the RX UEs transmitting the feedback to the eNB, the eNB can effectively analyze the various feedback received, and could thereafter issue one command (e.g., a power control command) to a TX UE based on the analysis.

Furthermore, in other embodiments, the TX UE 803, which receives feedback directly from RX UE 816 via feedback path 848, may additionally forward the feedback received from the RX UE 816 (or multiple RX UEs) to the eNB 832 via feedback path 850.

Similarly, the RX UE 813 may receive feedback from RX UEs 814 and 815 via the TX UE 802, and in some cases, may forward the feedback to the eNB 832 via a feedback path 851. By forwarding the various feedback to the eNB 832, the eNB 832 is able to have control over D2D transmissions by incorporating all the feedback from all the RX UEs 813, 814, and 815, even though some of the UEs (814 and 815) are out of coverage of the eNB 832. Accordingly, some RX UEs can transmit feedback directly to a corresponding TX UE, while other RX UEs can transmit the feedback directly to a corresponding eNB.

As previously mentioned, which of the feedback paths is/are used to transmit feedback may be determined by one or more factors.

In a first exemplary embodiment, a TX UE determines which feedback path(s) that one or more corresponding RX UEs should use. For example, the TX UE may explicitly indicate which feedback path/channel an RX UE should use, and may determine which path according to a coverage state of the TX UE. For example, TX UE 802 may be aware that it is out of range, and therefore cannot receive any communication from eNB 832. Because the TX UE 802 cannot receive any feedback from the eNB 832, the TX UE 802 may indicate that it desires the feedback to come directly from the RX UEs 813, 814, and 815 with which it is engaging in D2D communication. Accordingly, the RX UEs 813, 814, and 815 may transmit feedback directly to the TX UE 802 (e.g., via respective ones of the feedback paths 845, 846, or 847. Accordingly, the TX UE's indication as to which feedback path(s) should be used is based on its own coverage state, and the method to provide the indication may be done in various ways.

According to one method of the present embodiment, the TX UE's coverage state (e.g., whether in coverage or out of coverage) may be indicated by coverage state information included in a SA sent by the TX UE. For example, the coverage state information may indicate whether the TX UE expects the RX UE to use a direct path, or an indirect path. If the TX UE is out of coverage (e.g., TX UE 802), the coverage state information may be sent in an SA (e.g., via transmission path 860), and may indicate to a corresponding RX UE (e.g., the RX UE 813) that the TX UE desires the RX UE to use a direct feedback path (e.g., feedback path 847) to transmit feedback to the TX UE.

According to another method of the present embodiment, the TX UE's coverage state information indicated in the SA may indicate whether the TX UE is in UL/DL coverage of the corresponding eNB. In this embodiment, the TX UE may indicate in the SA received by one or more corresponding RX UEs whether the TX UE is in uplink and/or downlink coverage. In the present embodiment, the TX UE might not dictate to the RX UEs which feedback path to use, but instead may simply inform the RX UEs of the TX UE's coverage state. Thereafter, the RX UE's may individually decide which feedback paths to use.

According to yet another method of the present embodiment, instead of indicating the TX UE's coverage state in an SA, the SA received by a corresponding RX UE may indicate whether Mode 1 or Mode 2 is being used by the TX UE for resource allocation. In some cases, there might not be a need for an explicit indication of whether the TX UE is using Mode 1 or Mode 2, as the RX UE may be able to simply deduce whether Mode 1 or Mode 2 is being used by analyzing the resources being used (e.g., when Mode 1 and Mode 2 use separate SA resource pools). Furthermore, the RX UE may determine that the TX UE is within coverage when Mode 1 is being used. However, if the TX UE is using Mode 2, the TX UE may be out of coverage, or may be using Mode 2 simply to avoid involving the network (e.g., if the network is burdened or overloaded) by using a direct path. By the TX UE avoiding use of network control when it is not required, overall performance of the network may be improved.

According to a second exemplary embodiment, an RX UE may determine which feedback path(s) to use based on its own coverage state. For example, if the RX UE is in coverage (e.g., RX UE 812) the RX UE may choose an indirect feedback path (e.g., feedback paths 843 and 844). If the RX UE is out of coverage (e.g., RX UE 816), the RX UE may choose a direct feedback path (e.g., feedback path 848).

According to a third exemplary embodiment, an RX UE may determine which feedback path(s) to use based on an analysis of both its own coverage state, as well as a coverage state indicated by a corresponding TX UE. For example, if either the TX UE or the RX UE is outside of coverage, the RX UE may choose to use a direct feedback path. If both the TX UE and the RX UE are within coverage (e.g., TX UE 801 and RX UE 811), then the RX UE may choose an indirect feedback path (e.g., feedback paths 841 and 842).

As previously mentioned, the information contained in the feedback may generally be a function of a discovery signal transmitted by a TX UE and/or a SA transmitted by the TX UE.

With respect to what information is contained in the feedback from a viewpoint of the RX UE, once a feedback path is determined (e.g., once the feedback path is determined according to one or more signals received from the TX UE), the feedback the RX UE transmits may be a function of the SA transmitted by the TX UE, the discovery signal transmitted by the TX UE, and/or the D2D data. In one embodiment, the information contained in the feedback may correspond to power control. In another embodiment, the information contained in the feedback may correspond to an ACK/NACK. For example, if a signal is being transmitted from the TX UE at full power, such as a case when the TX UE is transmitting SAs at full power, the RX UE can transmit feedback information to the TX UE to enable calculation of how far the RX UE is from the TX UE. Similarly, a discovery signal can be used (e.g., if a discovery signal is transmitted at fixed power). Accordingly, an SA and a discovery signal can be used to calculate what kind of feedback is to be transmitted.

Exemplary embodiments discussed below provide a method for providing feedback control for D2D communications.

Figure 9:
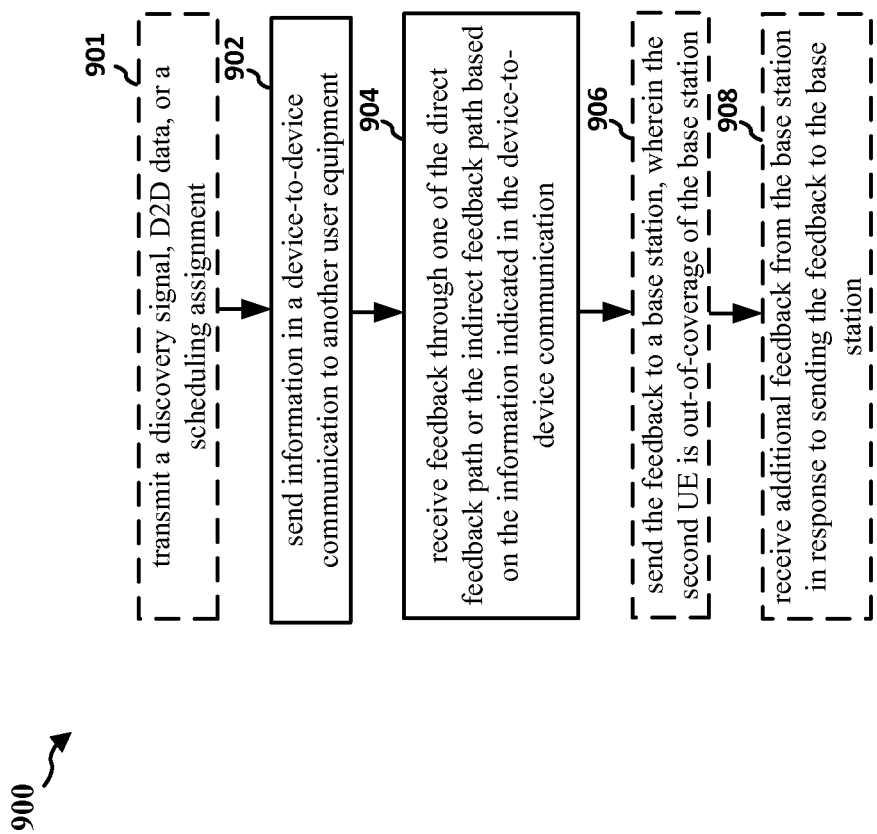
FIG. 9 is a flow chart of a method of wireless communication.

According to the exemplary embodiment, FIG. 9 is a flow chart 900 of a method of wireless communication. The method may be performed by a UE.

As shown in FIG. 9, at step 901, a UE may transmit a discovery signal, D2D data, or an SA, and the feedback may be a function of the discovery signal, D2D data, or the SA. For example, referring to FIG. 8, the UE 801, 802, or 803 may transmit 860, 861, 862, 863, 864, or 865 a discovery signal, D2D data, or an SA.

At step 902, the UE transmits information in a D2D communication to a second UE, the information indicating whether the second UE should use a direct feedback path to the UE or an indirect feedback path to the UE. For example, referring to FIG. 8, the UE (e.g., TX UEs 801, 802, or 803) transmits information in a D2D communication (e.g., 860, 861, 862, 863, 864, or 865) to a second UE (e.g., one of RX UEs 811 or 812 corresponding to TX UE 801, RX UEs 813, 814, or 815 corresponding to TX UE 802, or RX UE 816 corresponding to TX UE 803), the information indicating whether the second UE 811, 812, 813, 814, 815, or 816 should use a direct feedback path (path 847 corresponding to RX UE 813, path 845 corresponding to RX UE 814, path 846 corresponding to RX UE 815, and path 848 corresponding to RX UE 816) to the UE 802 or 803, or an indirect feedback path (path 841-842 corresponding to RX UE 811, or path 843-844-842 corresponding to RX UE 812) to the UE 801.

At step 904, the UE receives feedback through one of the direct feedback path or the indirect feedback path based on the information indicated in the D2D communication. For example, referring to FIG. 8, the UE 802 or 803 receives feedback through one of the direct feedback paths 845, 846, 847, or 848, the indirect feedback path 841-842, or the indirect feedback path 843-844-842 based on the information indicated in the D2D communication 860, 861, 862, 863, 864, or 865.

At step 906, the UE may transmit the feedback to a base station, wherein the second UE is out-of-coverage of the base station. For example, referring to FIG. 8, the UE 803 may transmit the feedback 850 to a base station 832, wherein the second UE 816 is out-of-coverage of the base station 832. At step 908, the UE may receive additional feedback from the base station in response to transmitting the feedback to the base station. For example, referring to FIG. 8, the UE 803 may receive additional feedback 849 from the base station 832 in response to transmitting the feedback 850 to the base station 832.

In one configuration, the indirect feedback path includes a first path from the second UE to a base station and a second path from the base station to the UE. For example, referring to FIG. 8, the indirect feedback path 841-842 includes a first path 841 from the second UE 811 to a base station 832 and a second path 842 from the base station 832 to the UE 801.

In one configuration, the indirect feedback path includes a first path from the second UE to a first base station serving the second UE, a second path from the first base station to a second base station serving the UE, and a third path from the second base station to the UE. For example, referring to FIG. 8, the indirect feedback path 843-844-842 includes a first path 843 from the second UE 812 to a first base station 822 serving the second UE 812, a second path 844 from the first base station 822 to a second base station 832 serving the UE 801, and a third path 842 from the second base station 832 to the UE 801.

In one configuration, the feedback includes a power control command. The UE may adjust a transmission power according to the feedback including the power control command. In one configuration, the feedback corresponds to an ACK/NACK. In one configuration, the information indicated in the D2D communication indicates explicitly whether to use the direct path or the indirect path. In one configuration, the information indicated in the D2D communication indicates whether the UE is within coverage of a base station. In one configuration, the information indicated in the D2D communication indicates a resource allocation mode of the UE.

Figure 10:
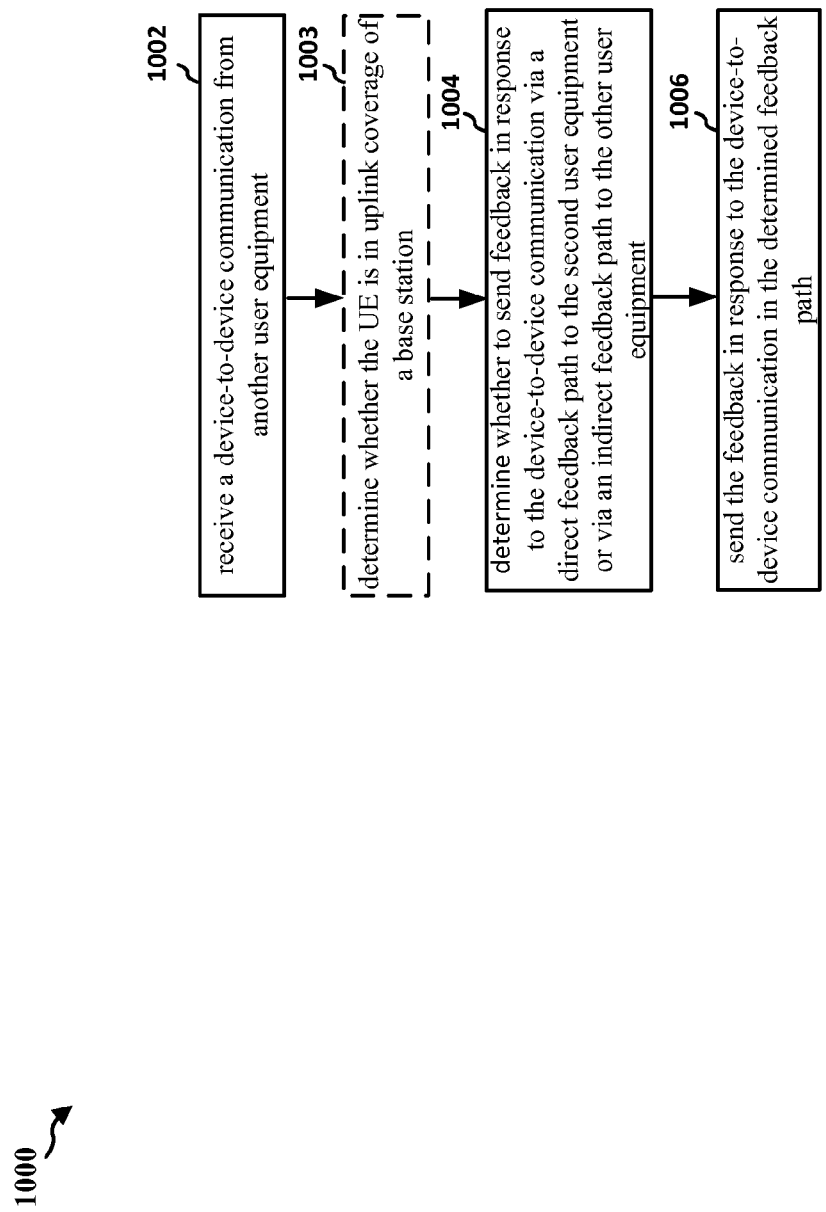
FIG. 10 is a flow chart of a method of wireless communication.

According to the exemplary embodiment, FIG. 10 is a flow chart 1000 of a method of wireless communication. The method may be performed by a UE.

As shown in FIG. 10, at step 1002, a UE receives a D2D communication from a second UE. For example, referring to FIG. 8, the UE (e.g., one of RX UEs 811 or 812 corresponding to TX UE 801, RX UEs 813, 814, or 815 corresponding to TX UE 802, or RX UE 816 corresponding to TX UE 803) receives a D2D communication 860, 861, 862, 863, 864, or 865 from a second UE 801, 802, or 803.

At step 1003, the UE may determine whether the UE is in uplink coverage of a base station. For example, referring to FIG. 8, the UE 811, 812, 813, 814, 815, or 816 may determine whether the UE 811, 812, 813, 814, 815, or 816 is in uplink coverage of a base station (e.g., base station 832 corresponding to UEs 811 or 813, or base station 822 corresponding to UE 812).

At step 1004, the UE determines whether to transmit feedback in response to the D2D communication via a direct feedback path to the second UE or via an indirect feedback path to the second UE. For example, referring to FIG. 8, the UE determines whether to transmit feedback in response to the D2D communication 860, 861, 862, 863, 864, or 865 via a direct feedback path (path 847 corresponding to RX UE 813, path 845 corresponding to RX UE 814, path 846 corresponding to RX UE 815, and path 848 corresponding to RX UE 816) to the second UE 802 or 803 or via an indirect feedback path (path 841-842 corresponding to RX UE 811, or path 843-844-842 corresponding to RX UE 812) to the second UE 801.

At step 1006, the UE transmits the feedback in response to the D2D communication in the determined feedback path. For example, referring to FIG. 8, the UE 811, 812, 813, 814, 815, or 816 transmits the feedback in response to the D2D communication 860, 861, 862, 863, 864, or 865 in the determined feedback path 845, 846, 847, 848, 841-842, or 843-844-842.

In one configuration, the indirect feedback path includes a first path from the UE to a base station, and a second path from the base station to the second UE. For example, referring to FIG. 8, the indirect feedback path 841-842 includes a first path 841 from the UE 811 to a base station 832, and a second path 842 from the base station 832 to the second UE 801.

In one configuration, the indirect feedback path includes a first path from the UE to a first base station serving the UE, a second path from the first base station to a second base station serving the second UE, and a third path from the second base station to the second UE. For example, referring to FIG. 8, the indirect feedback path 843-844-842 includes a first path 843 from the UE 812 to a first base station 822 serving the UE 812, a second path 844 from the first base station 822 to a second base 832 station serving the second UE 801, and a third path 842 from the second base station 832 to the second UE 801.

In one configuration, the D2D communication is a discovery signal or an SA, and the feedback comprises a power control command. In one configuration, the D2D communication is a D2D data communication, and the feedback corresponds to an ACK/NACK.

In one configuration, the UE may receive a second D2D communication indicating whether to use the direct path or the indirect path. The second D2D communication may be an SA. The information indicated in the second D2D communication may indicate explicitly whether to use the direct path or the indirect path. The information indicated in the second D2D communication may indicate whether the second UE is within coverage of a base station. The information indicated in the second D2D communication may indicate a resource allocation mode of the second UE.

In one configuration, the UE may determine whether the UE is in coverage of a base station, wherein the UE determines to use the direct feedback path when the UE is outside coverage of a base station, and determines to use the indirect feedback path when the UE is in coverage of the base station. For example, referring to FIG. 8, the UE 811 or 816 may determine whether the UE 811 or 816 is in coverage of a base station 832, wherein the UE 816 determines to use the direct feedback path 848 when the UE 816 is outside coverage of the base station 832, and the UE 811 determines to use the indirect feedback path 841-842 when the UE 811 is in coverage of the base station 832.

Figure 11:
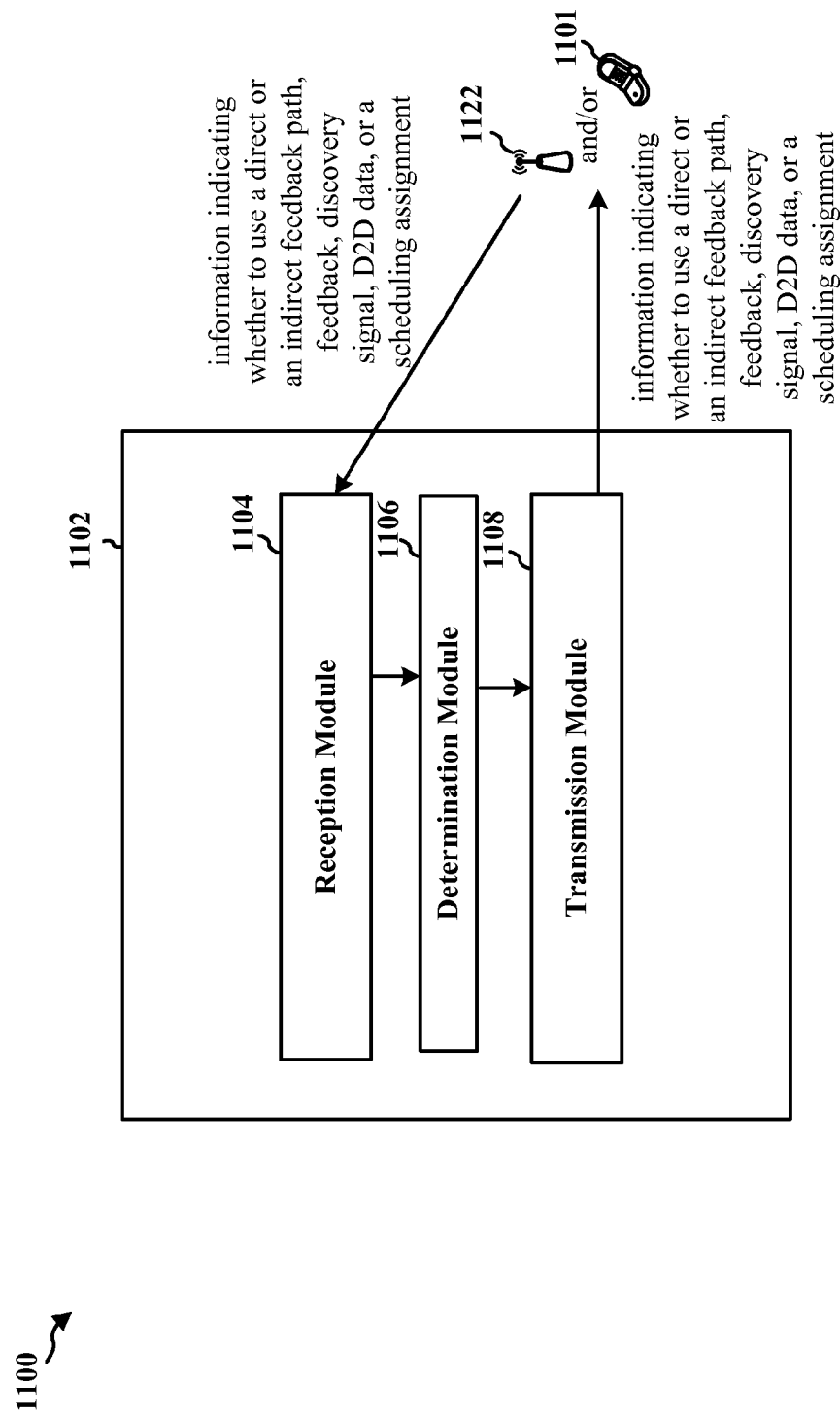
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus 1102 includes a reception module 1104 that is configured to receive feedback through one of the direct feedback path or the indirect feedback path based on the information indicated in the D2D communication, to receive additional feedback from the base station (e.g., base station 1122) in response to transmitting the feedback to the base station, to receive a D2D communication from another UE (e.g., UE 1101), and to receive a second D2D communication indicating whether to use the direct path or the indirect path.

The apparatus 1102 further includes a determination module 1106 that is configured to communicate with the reception module 1104, and that is configured to determine whether to transmit feedback in response to a D2D communication via a direct feedback path to another UE (e.g., 1101) or via an indirect feedback path to another UE, and to determine whether the UE is in uplink coverage of a base station (e.g., base station 1122).

The apparatus 1102 further includes a transmission module 1108 that is configured to communicate with the determination module 1106, and that is configured to transmit information in a D2D communication to another UE (e.g., UE 1101) to indicate whether to use a direct feedback path or an indirect feedback path via a base station (e.g., base station 1122), to transmit a discovery signal, D2D data, or a scheduling assignment, and to transmit the feedback in response to the D2D communication in the determined feedback path.

The apparatus may include additional modules that perform each of the blocks of the algorithm in the aforementioned flow charts of FIGS. 9 and/or 10. As such, each block in the aforementioned flow charts of FIGS. 9 and/or 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
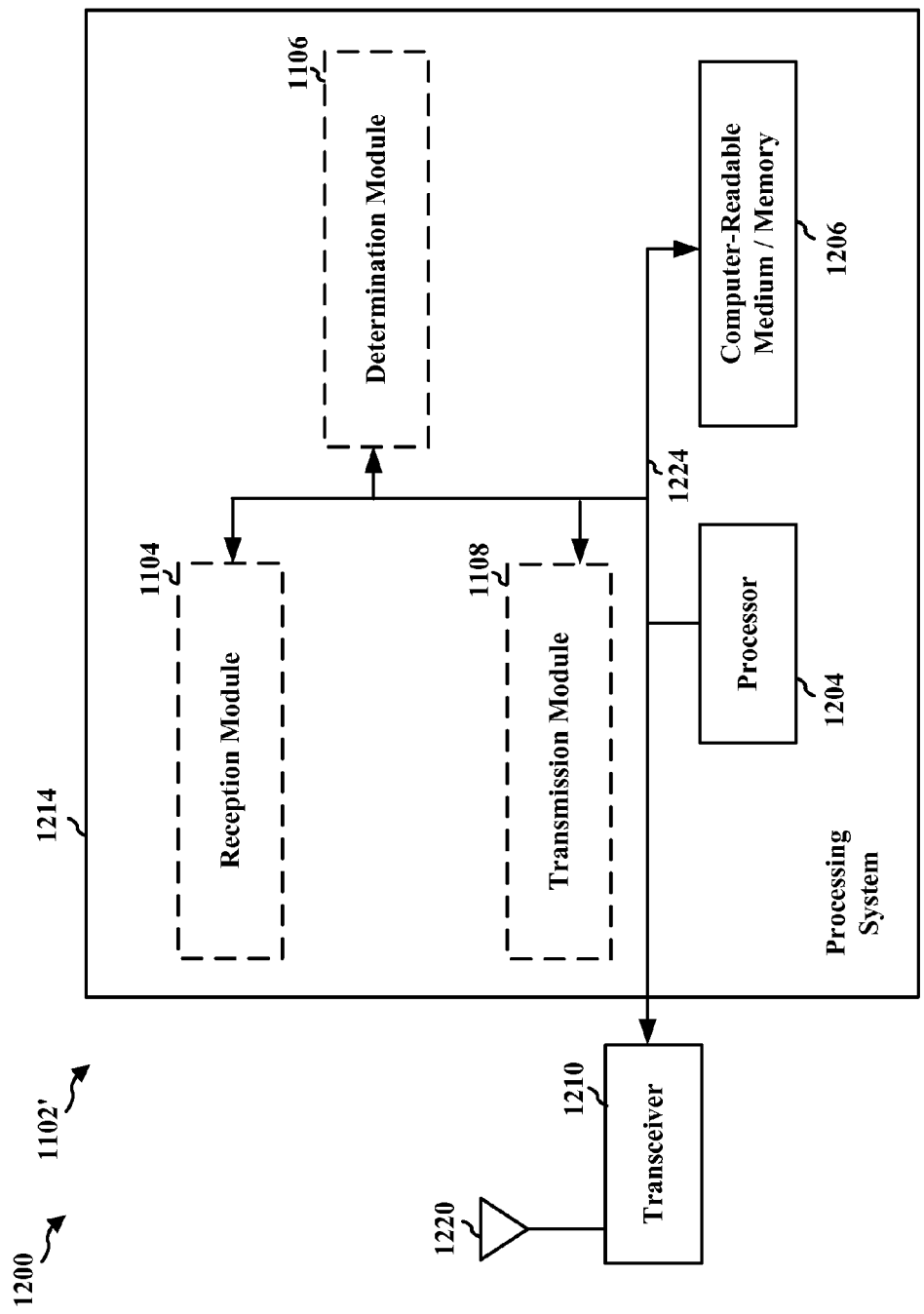
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception module 1104. In addition, the transceiver 1210 receives information from the processing system 1214, specifically the transmission module 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206.

The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, and 1108. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for transmitting information in a D2D communication to a second UE, the information indicating whether the second UE should use a direct feedback path to the UE or an indirect feedback path to the UE. The UE further includes means for receiving feedback through one of the direct feedback path or the indirect feedback path based on the information indicated in the D2D communication. The UE may further include means for transmitting the feedback to a base station, wherein the second UE is out-of-coverage of the base station. The UE may further include means for receiving additional feedback from the base station in response to transmitting the feedback to the base station. The UE may further include means for transmitting the feedback to a base station, wherein the second UE is out-of-coverage coverage of the base station. The UE may further include means for receiving additional feedback from the base station in response to transmitting the feedback to the base station. The UE may further include means for transmitting a discovery signal, D2D data, or a scheduling assignment, wherein the feedback is a function of the discovery signal, D2D data, or the scheduling assignment.

Another embodiment of the UE includes means for receiving a D2D communication from a second UE. The UE further includes means for determining whether to transmit feedback in response to the D2D communication via a direct feedback path to the second UE or via an indirect feedback path to the second UE. The UE further includes means for transmitting the feedback in response to the D2D communication in the determined feedback path. The UE may further include means for receiving a second D2D communication indicating whether to use the direct path or the indirect path. The UE may further include means for determining whether the UE is in uplink coverage of a base station.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first user equipment (UE), comprising:
    transmitting information in a device-to-device (D2D) communication including at least one of a discovery signal or a scheduling assignment to a second UE, the information in the at least one of a discovery signal or a scheduling assignment indicating whether the second UE is to use a direct feedback path for transmitting feedback from the second UE to the first UE or an indirect feedback path for transmitting feedback to the first UE; and
    receiving feedback from the second UE through one of the direct feedback path or the indirect feedback path based on the information indicated in the at least one of a discovery signal or a scheduling assignment in the D2D communication.

2. The method of claim 1, wherein the indirect feedback path comprises:
    a first path from the second UE to a base station; and
    a second path from the base station to the first UE.

3. The method of claim 1, wherein the feedback comprises a power control command.

4. The method of claim 1, wherein the information indicated in the D2D communication indicates explicitly whether to use the direct path or the indirect path.

5. The method of claim 1, wherein the information indicated in the D2D communication indicates whether the first UE is within coverage of a base station.

6. The method of claim 1, wherein the information indicated in the D2D communication indicates a resource allocation mode of the first UE used for D2D communication.

7. The method of claim 1, further comprising:
transmitting the feedback to a base station, wherein the second UE is out-of-coverage of the base station; and
receiving additional feedback from the base station in response to transmitting the feedback to the base station.

8. The method of claim 1, wherein the feedback is a function of the discovery signal, D2D data, or the scheduling assignment.

9. A method of wireless communication of a first user equipment (UE), comprising:
receiving a device-to-device (D2D) communication including at least one of a discovery signal or a scheduling assignment from a second UE, the D2D communication including information in the at least one of a discovery signal or a scheduling assignment indicating whether the first UE is to use a direct feedback path for transmitting feedback from the first UE to the second UE or an indirect feedback path for transmitting feedback to the second UE;
determining whether to transmit feedback from the first UE via the direct feedback path to the second UE or via the indirect feedback path to the second UE based on the information indicated in the at least one of a discovery signal or a scheduling assignment in the D2D communication; and
transmitting the feedback from the first UE in response to the D2D communication in the determined feedback path.

10. The method of claim 9, wherein the indirect feedback path comprises:
a first path from the first UE to a base station, and
a second path from the base station to the second UE.

11. The method of claim 9, wherein the feedback comprises a power control command.

12. The method of claim 9, further comprising receiving a second D2D communication indicating whether to use the direct path or the indirect path.

13. The method of claim 9, further comprising determining whether the first UE is in uplink coverage of a base station,
wherein determining whether to transmit feedback from the first UE via the direct feedback path or the indirect feedback path is further based on whether the first UE is determined to be in the uplink coverage of the base station, and wherein the first UE determines to use the direct feedback path when the first UE is outside uplink coverage of the base station, and determines to use the indirect feedback path when the first UE is in uplink coverage of the base station.

14. The method of claim 9, wherein the direct feedback path or the indirect feedback path for transmitting feedback from the first UE to the second UE is determined further based on information from a base station, or information stored in the first UE.

15. An apparatus for wireless communication of a first user equipment (UE), comprising:
a memory; and
at least one processor coupled to the memory and configured to:
transmit information in a device-to-device (D2D) communication including at least one of a discovery signal or a scheduling assignment to a second UE, the information in the at least one of a discovery signal or a scheduling assignment indicating whether the second UE is to use a direct feedback path for transmitting feedback from the second UE to the first UE or an indirect feedback path for transmitting feedback to the first UE; and
receive feedback from the second UE through one of the direct feedback path or the indirect feedback path based on the information indicated in the at least one of a discovery signal or a scheduling assignment in the D2D communication.

16. The apparatus of claim 15, wherein the indirect feedback path comprises:
a first path from the second UE to a base station; and
a second path from the base station to the first UE.

17. The apparatus of claim 15, wherein the feedback comprises a power control command.

18. The apparatus of claim 15, wherein the feedback corresponds to an acknowledgment/negative-acknowledgement (ACK/NACK).

19. The apparatus of claim 15, wherein the information indicated in the D2D communication indicates explicitly whether to use the direct path or the indirect path.

20. The apparatus of claim 15, wherein the information indicated in the D2D communication indicates whether the first UE is within coverage of a base station.

21. The apparatus of claim 15, wherein the information indicated in the D2D communication indicates a resource allocation mode of the first UE.

22. The apparatus of claim 15, wherein the at least one processor is further configured to:
transmit the feedback to a base station, wherein the second UE is out-of-coverage of the base station; and
receive additional feedback from the base station in response to transmitting the feedback to the base station.

23. The apparatus of claim 15, wherein the feedback is a function of the discovery signal, D2D data, or the scheduling assignment.

24. An apparatus for wireless communication of a first user equipment (UE), comprising:
a memory; and
at least one processor coupled to the memory and configured to:
receive a device-to-device (D2D) communication including at least one of a discovery signal or a scheduling assignment from a second UE, the D2D communication including information in the at least one of a discovery signal or a scheduling assignment indicating whether the first UE is to use a direct feedback path for transmitting feedback from the first UE to the second UE or an indirect feedback path for transmitting feedback to the second UE;
determine whether to transmit feedback from the first UE via the direct feedback path to the second UE or via the indirect feedback path to the second UE based on the information indicating whether the first UE is to use the direct feedback path or indirect feedback path for transmitting feedback to the second UE; and
transmit the feedback from the first UE in response to the at least one of a discovery signal or a scheduling assignment in the D2D communication in the determined feedback path.

25. The apparatus of claim 24, wherein the indirect feedback path comprises:
a first path from the first UE to a base station, and
a second path from the base station to the second UE.

26. The apparatus of claim 24, wherein the feedback comprises a power control command.

27. The apparatus of claim 24, wherein the D2D communication is a D2D data communication, and wherein the feedback corresponds to an acknowledgment/negative-acknowledgement (ACK/NACK).

28. The apparatus of claim 24, wherein the at least one processor is further configured to receive a second D2D communication indicating whether to use the direct path or the indirect path.

29. The apparatus of claim 24, wherein the at least one processor is further configured to determine whether the first UE is in uplink coverage of a base station,
   wherein determining whether to transmit feedback from the first UE via the direct feedback path or the indirect feedback path is further based on whether the first UE is determined to be in the uplink coverage of the base station, and wherein the first UE determines to use the direct feedback path when the first UE is outside uplink coverage of the base station, and determines to use the indirect feedback path when the first UE is in uplink coverage of the base station.

30. The apparatus of claim 24, wherein the at least one processor is configured to determine the direct feedback path or the indirect feedback path for transmitting feedback from the first UE to the second UE further based on information from a base station, or information stored in the first UE.

31. The method of claim 1, wherein transmitting information in a D2D communication including at least one of a discovery signal or a scheduling assignment to a second UE, comprises the scheduling assignment.

* * * * *